Nov. 25, 1952     C. S. PRESCOTT     2,618,902
PLANT SUPPORT
Filed March 3, 1949
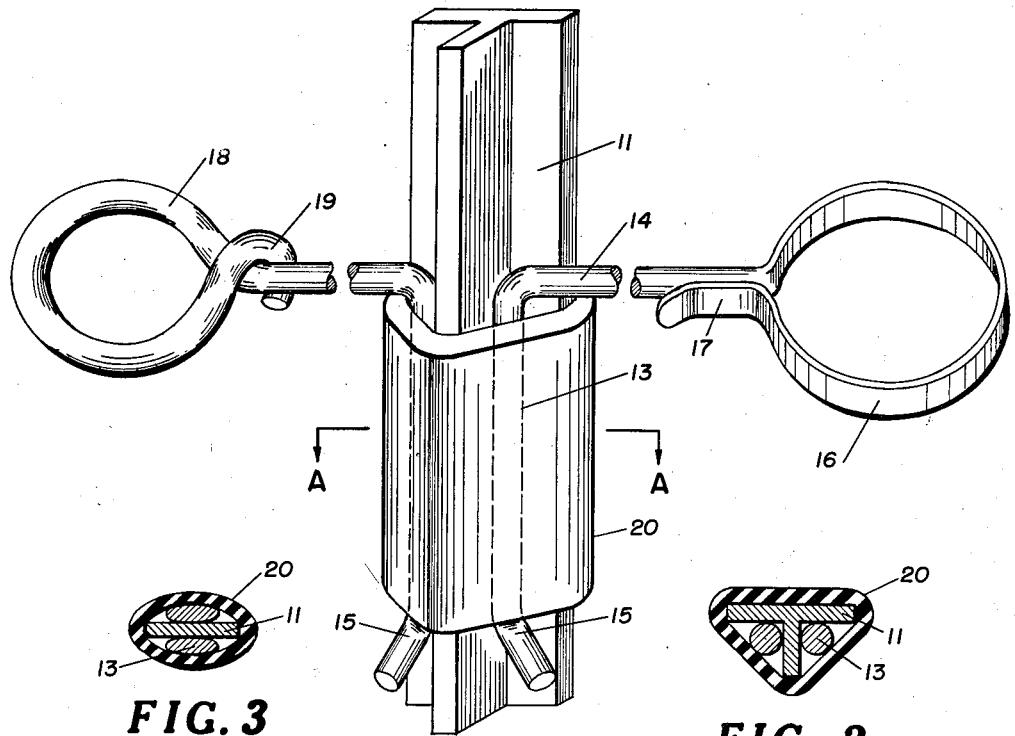
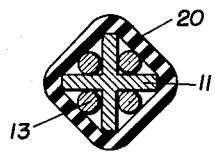
FIG. 3
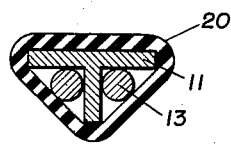
FIG. 2
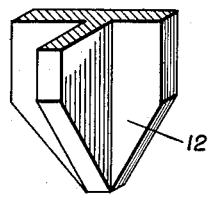
FIG. 4
FIG. 1
FIG. 5
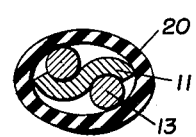
FIG. 6
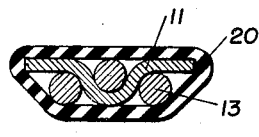
FIG. 7
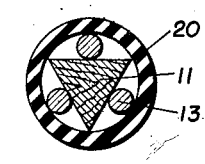
FIG. 8
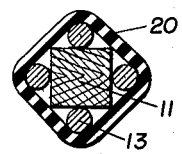
FIG. 9
INVENTOR.
CHARLES S. PRESCOTT
BY

UNITED STATES PATENT OFFICE 2,618,902

PLANT SUPPORT

Charles S. Prescott, North Muskegon, Mich.

Application March 3, 1949, Serial No. 79,359

2 Claims. (Cl. 47—47)

This invention relates to improvements in plant supports of a type which are useful for holding up flowers such as dahlias and irises or vegetables such as tomatoes which have a stalk that is not strong in itself to support the plant.

It is the chief object of my invention to provide an extremely simple means for supporting flowers or vegetables which may be reused repeatedly and which will be economical to manufacture. Furthermore, the device is extremely simple to set up and adjust so that complicated instructions are unnecessary.

The above, and other features of the invention will be apparent from the following disclosure when read in connection with the accompanying drawing in which Figure 1 is a perspective view of a plant support embodying the features of the present invention;

Figures 2 to 9 are cross sections of the support taken in the plane A—A showing variations in form of the stake illustrated in Figure 1.

Referring first to Figure 1 of the drawing, the stake 11 is preferably formed of a non-corrosive metal such as aluminum, brass, or plated iron or steel, although wood or plastic can be employed and is provided with a pointed end 12. The length of the stake will, of course, vary depending on the height of the plant to be supported. Placed upon the stake is a snugly fitting collar 20 which preferably takes the form of a short length of tube extruded from either rubber or a flexible plastic. The internal diameter of the elastic collar 20 is such that it must be slightly distended to fit over the stake 11. In this way the collar will be retained at any point along the length of the stake where it is set.

The third element of the plant support is supporting arm 14. One end of the arm 14 is bent at right angles to form bracket 13. The length of the bracket is approximately equal to the length of the collar 20. A grip 15 is formed at the end of bracket 13 to ensure that the bracket will be held snugly between the stake 11 and collar 20. Furthermore, the grip 15, which is formed by placing a slight bend at the extreme end of the bracket 13, provides sufficient resistance to the removal of arm 14 so that it cannot be unintentionally lifted out of position.

The opposite end of supporting arm 14 is bent into a circlet 16 which holds the stalk of the plant. The circlet may take several forms. For example, as shown in the drawing, it can be made of flattened spring stock. In this case the jaw 17 of the circlet may be opened to permit insertion of the stalk of the plant. In another form, which is also illustrated, the circlet 18 is formed of a metal rod which is bent back upon itself to form a catch 19 that holds the ring together after the grip is clasped around the stalk of the plant.

As shown in Figures 1 and 2 the stake is of T-shaped cross section. When the flexible collar is fitted over the stake, two channels are formed into which the brackets 13 of the plant support arm 14 may be inserted. While a certain amount of resistance to insertion is provided by grip 15 this is not sufficient to be inconvenient.

Stake 11 may be made in a variety of cross sections, the significant feature being that in each case the end of the plant support arm is held between a portion of the stake and a portion of the surrounding collar.

As shown in Figure 3 the stake may be a flat strip of metal and it may be desirable to somewhat flatten the bracket of the plant support arm. If this is done the plant support arm will always project from the stake at the same angle, a feature which may be desirable under certain conditions although it is not essential since an entirely satisfactory construction may be made with arms of round cross-section and a flat stake as shown in Figure 5. In general, however, the maximum degree of rigidity of the stake is secured if the stake has a structural cross section—a cross as shown in Figure 4; an S as illustrated in Figure 6 or a U as shown in Figure 7.

The stakes illustrated in Figures 1 to 7 are shown as being made of metal. However, the triangular stake of Figure 8 and the square stake shown in Figure 9 are adapted to be made of wood or inexpensive plastic.

It has been found in practice that it is preferable to market the stake with the collar in its approximate position so that the user merely has to adjust it upwards or downwards to have the circlet 17 contact the plant stalk at the desired point. In many cases where tall plants are involved it may be desirable to use two or more sets of collars and grips on one single stake and this is, of course, entirely practicable.

While I have described quite specifically the embodiment of the invention herein illustrated, it is understood that various modifications may be made by those skilled in the art—for example by forming the collar of spring metal rather than plastic or rubber—without departing from the invention as defined in the following claims.

What I claim is:

1. A supporting structure comprising a stake, a flexible collar whose internal dimension when unflexed is such that the collar must be distended to surround the stake, said collar being distended and mounted on said stake to surround said stake, and the cross section of the stake being such that the collar engages it circumferentially at some points but not at others thereby forming at least one channel between the collar and the stake parallel to the stake, and a plant support arm one end of which is inserted in the channel between the collar and the stake, the other end extending outwardly from the stake.

2. A supporting structure according to claim 1 in which the end of the arm which is inserted in the channel between the collar and the stake extends through the channel and is provided with a bent portion beneath the collar forming a retaining grip.

CHARLES S. PRESCOTT.

REFERENCES CITED

The following references are of record in the file of this patent:

UNITED STATES PATENTS

| Number | Name | Date |
|---|---|---|
| 541,285 | Mills | June 18, 1895 |
| 2,024,546 | Starkey | Dec. 17, 1935 |

FOREIGN PATENTS

| Number | Country | Date |
|---|---|---|
| 4,075 | Great Britain | 1907 |
| 18,735 | Germany | Aug. 23, 1882 |
| 27,370 | Great Britain | Oct. 27, 1902 |
| 45,520 | Denmark | Apr. 2, 1932 |
| 133,395 | Switzerland | Aug. 1, 1929 |
| 287,699 | Great Britain | Mar. 29, 1928 |
| 320,689 | Great Britain | Oct. 24, 1929 |